A. F. RANDALL & E. A. BATES.
A. BATES, ADMINISTRATOR OF E. A. BATES, DEC'D.
APPARATUS FOR GENERATING STEAM.
APPLICATION FILED FEB. 3, 1900.
1,109,360.
Patented Sept. 1, 1914.
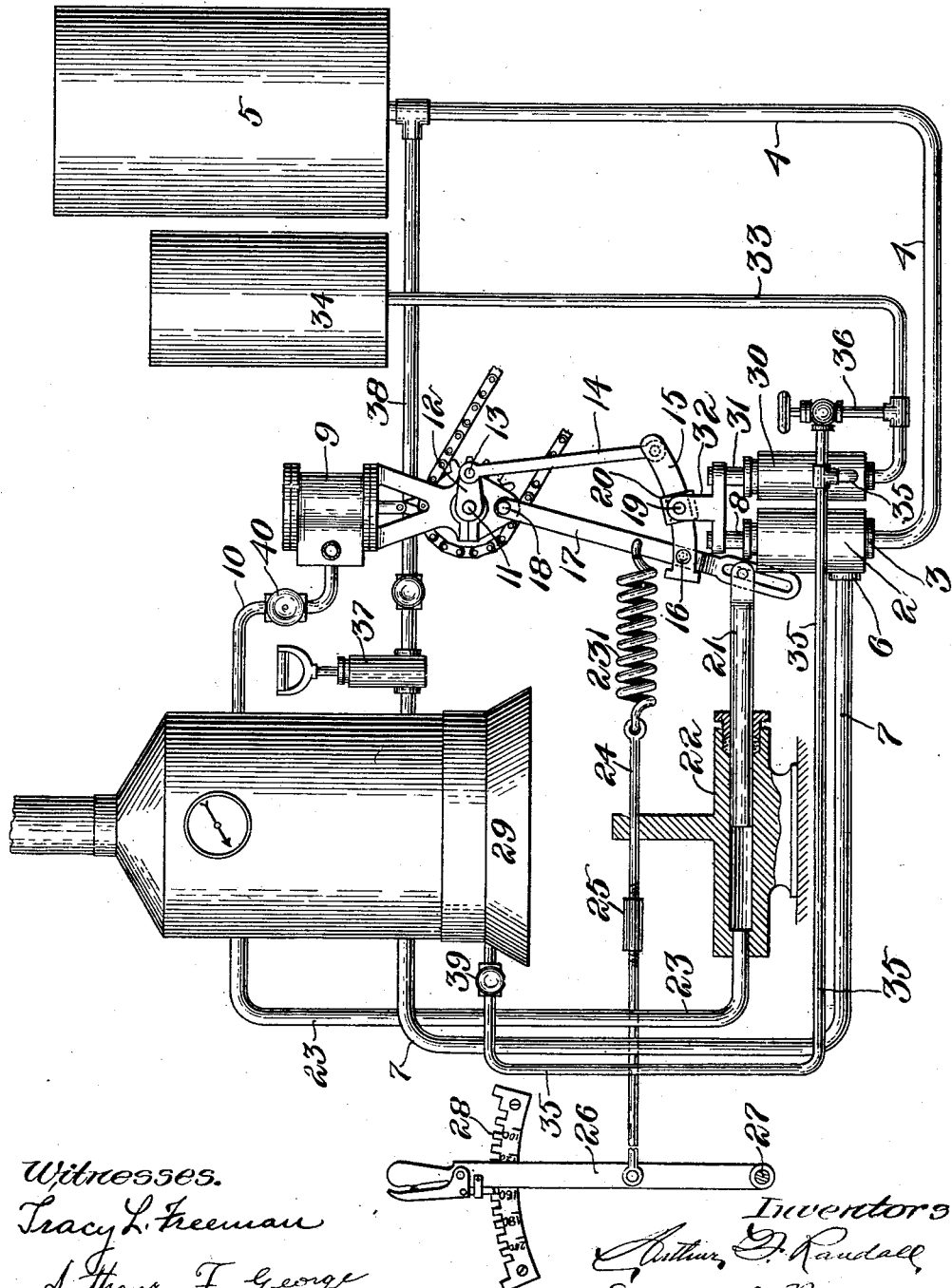

UNITED STATES PATENT OFFICE.

ARTHUR F. RANDALL, OF SOMERVILLE, AND EDMUND A. BATES, OF CHELSEA, MASSACHUSETTS; ALFRED BATES ADMINISTRATOR OF SAID EDMUND A. BATES, DECEASED.

APPARATUS FOR GENERATING STEAM.

1,109,360.   Specification of Letters Patent.   Patented Sept. 1, 1914.

Application filed February 3, 1900. Serial No. 3,803.

*To all whom it may concern:*

Be it known that we, ARTHUR F. RANDALL, of Somerville, in the county of Middlesex and State of Massachusetts, and EDMUND A. BATES, of Chelsea, in the county of Suffolk and State of Massachusetts, have invented an Improved Apparatus for Generating Steam, of which the following is a specification.

In the drawing we have illustrated our invention by a diagram for clearness from which, and the following description, a full and clear understanding of our invention may be had.

Our invention has for its object to provide a steam generating apparatus which will act automatically to maintain the steam in the generator or boiler at a predetermined degree of pressure under variations in the rate at which steam is utilized by or supplied to the motor of the engine.

Our invention also has for its object to provide such a system of control for steam actuated apparatus which will be particularly adapted for use in motor propelled vehicles although it will be clear from what follows that our invention is not limited in this respect.

Our invention is hereinafter more fully set forth in the following description, and the novel features thereof are particularly pointed out and clearly defined in the claims at the close thereof.

Having reference to the drawing: 1 represents a steam generator of that class known as flash boilers, sometimes called "flashers," which may be of any suitable type, and 2 the water feed pump for supplying water to generator 1. The inlet 3 of pump 2 is connected by pipe 4 with water tank 5, and the outlet 6 of pump 2 is connected with generator 1 by pipe 7. Pump 2 draws water from tank 5 and forces it into generator 1; and said pump is herein shown as driven by motor 9 connected by pipe 10 with generator 1 and driven by the steam generated in the latter.

On crank shaft 11 of motor 9 is fast a crank 12, and the crank pin 13 of that crank is connected by a link 14 to one end of a curved lever 15, and the fulcrum of lever 15 is the axis of pin 16 which connects lever 15 with a frame 17 pivoted at 18 upon the frame of motor 9.

The upper end of piston rod 8 of pump 2 is fast to a yoke 32 which is connected by pin 19 to a block 20 mounted on lever 15, and when shaft 11 is rotated, lever 15 is vibrated on its fulcrum 16 and piston rod 8 is reciprocated. When crank 12 has reached the limit of its movement toward pump 2 the axis of crank pin 13 is coincident with the axis of pin 18, and when in that position the curve of lever 15 is the arc of a circle whose center is the axis of pins 13 and 18 and link 14 and frame 17 can then be swung on pins 13 and 18 and lever 15 moved through block 20, to move fulcrum 16 toward and from pin 19 and thereby vary the length of the stroke of piston rod 8. The farther fulcrum 16 is away from pin 19 the greater will be the length of the stroke of piston rod 8, and when the axis of fulcrum 16 is moved into coincidence with the axis of pin 19 there will be no movement of piston rod 8, although lever 15 continues to be vibrated by crank 12. It will therefore be clear that by changing the relative positions of pin 19 and fulcrum 16 the quantity of water discharged from pump 2 at each stroke of its piston may be varied, and that although the length of the stroke of the piston is varied the point at which the inward stroke of the piston terminates is not varied.

Frame 17 is connected at its lower end to a plunger 21 which is mounted in cylinder 22, and cylinder 22 is connected by pipe 23 with generator 1 so that the pressure in cylinder 22 is practically the same as the pressure in generator 1, and varies as the pressure in generator 1 varies. The pressure in cylinder 22 acts under certain circumstances to swing frame 17 in one direction and to move fulcrum 16 toward pin 19, while a spring 231 acts to resist the outward movement of plunger 21, and under certain circumstances to swing frame 17 in the opposite direction and move fulcrum 16 away from pin 19. One end of spring 231 is connected to frame 17 and the other end to one end of a rod 24 made in two parts connected by a turnbuckle 25 for adjustment; and the other end of rod 24 is connected to a lever 26 fulcrumed at 27 on any suitable support. Lever 26 is under control of the operator, that is to say it may be adjusted by the operator and caused to occupy different positions so that the force exerted by spring 231 on frame 17 may be varied, and for the purpose of locking lever 26 in any one of its different positions a rack 28 is provided fastened to any suitable support, and the teeth of rack 28 are engaged by a spring pressed bolt on the upper end of lever 26 as shown clearly in the drawing. So long as the pressure in generator 1 is sufficient to hold the axis of fulcrum 16 in coincidence with the axis of pin 19 pump 2 will be stopped and maintained inoperative and the feed will be stopped, but when the pressure in generator 1 falls below a predetermined degree of pressure spring 231 moves fulcrum 16 away from pin 19 and pump 2 is started and caused to feed water to the boiler. Thus it will be clear that no water is discharged from pump 2 so long as a predetermined degree of pressure exists in the generator, and that pump 2 is caused to act only when the pressure in the generator falls below that predetermined degree of pressure, and that the quantity of water discharged by the pump during each stroke varies in proportion to the drop of generator pressure below that predetermined degree, and this is one of the distinguishing features of our invention.

In the best form of our invention the amount of fuel supplied to the furnace or burner 29 of generator 1 is varied when the amount of water fed to the generator is varied, and to accomplish this result the upper end of piston-rod 31 of oil pump 30 is herein shown as fast to yoke 32 to which is also fast the upper end of piston-rod 8, so that when the length of the stroke of piston-rod 8 is varied—that is to say, the yoke 32 serves as a means for synchronizing the movements of the pump pistons irrespective of the variations that are made in the lengths of their strokes—the length of the stroke of piston-rod 31 is correspondingly varied. Thus it will be clear that corresponding variations are caused in both the supply of water and the supply of fuel and this is an important feature of our invention.

The inlet of pump 30 is connected by pipe 33 with oil tank 34, and the outlet of pump 30 is connected with the burner of furnace 29 of generator 1 by pipe 35 so that when operated pump 30 draws oil from tank 34 and forces it into furnace 29.

One end of a by-pass 36 of comparatively small capacity communicates with pipe 33 at one side of pump 30, and the other end of by-pass 36 communicates with pipe 35 at the other side of pump 30, and this by-pass is normally open so that when pump 30 is stopped enough oil will pass through it around pump 30 to keep the burner of furnace 29 in operation until said pump is started up again.

With flash-boilers it is necessary to make the first injection of water by hand and for this reason we have shown an auxiliary hand-operated pump 37 located in a branch 38 of pipe 4, and in starting the engine in operation valve 39 in pipe 35 is opened and the oil ignited at the burner of furnace 29 and then pump 37 is operated by hand until enough steam has been generated in generator 1 with which to start motor 9, when throttle valve 40 is opened and motor 9 thereby set in operation; no further attention being required to be given to the engine by the operator unless it be to adjust lever 26 or to manipulate throttle 40 to control motor 9.

In the drawing, which is simply a diagram of one form of our invention, we have shown the two pumps as operated by and in unison with motor 9 but in practice the driving of the pumps may be accomplished by any well known mechanical means for securing such result.

When our invention is embodied in a motor propelled vehicle it is not essential that the two pumps be driven by the same motor which propels the vehicle, neither is it essential that the pumps be operated by a motor which is driven by the steam generated in boiler 1, for, while we have shown the two pumps as operated by motor 9 which is driven by the steam generated in boiler 1, yet it is to be understood that it is within the scope of our invention to employ any convenient means for driving the pumps.

What we claim is:—

1. In an apparatus for generating steam the combination of a boiler, a burner, a reciprocating pump for supplying water to the boiler, a reciprocating pump for supplying fuel to the burner, means for reciprocating said pumps in unison, and automatic means controlled by the pressure of the boiler for varying the quantities of water and fuel discharged during each reciprocation of the pumps in proportion to the drop of boiler pressure below a predetermined degree.

2. In a system of control for steam propelled vehicles, the combination of an engine, a boiler, a burner, a variable stroke water pump, a variable stroke fuel pump, means for synchronizing the movements of the pump pistons, means which receive a definite movement from the engine for driving the pumps, and automatic compensating means between the pump pistons and the driving means whereby the pump strokes can be varied.

3. In a system of control for steam-actuated apparatus, the combination of an engine, a boiler, a burner, variable stroke pumps for the water and fuel which automatically vary the amount supplied in accordance with the demand, a mechanical connection for driving the pumps from the engine which has a constant length of stroke, a compensating device between the connection and the pumps, and a throttle valve whereby the engine is directly, and the pumps indirectly controlled.

4. In a system of control for steam-actuated apparatus, the combination of a flash boiler, a burner, a variable-stroke pump for supplying water to the boiler, a direct connection between the boiler and the pump, a variable-stroke pump for supplying fuel to the burner, and a regulator which acts automatically to vary the stroke of both pumps and is itself controlled by the pressure of the boiler.

5. An apparatus for generating steam including in combination, a flash generator, a burner for heating the same, a pump for supplying water to the generator, a pump for supplying a fluid fuel to the burner, a motor connected with the generator, an adjustable connection through which said motor positively drives the two pumps in unison, and means controlled by the pressure of the fluid in the generator for automatically adjusting said connection so as to simultaneously vary the length of strokes of said pumps when the pressure in the generator changes and without varying the quantitative relation between the supplies of water and fuel.

ARTHUR F. RANDALL.
EDMUND A. BATES.

Witnesses:
SAML. A. BERRY,
ROBERT W. MORAN.

---

Copies of this patent may be obtained for five cents each, by addressing the "Commissioner of Patents, Washington, D. C."